(12) United States Patent
Furukawa (10) Patent No.: US 8,330,452 B2
(45) Date of Patent: Dec. 11, 2012

(54) BELT MONITORING SYSTEM (75) Inventor: Kazuya Furukawa, Kanagawa (JP)

(73) Assignee: Kabushiki Kaisha Bridgestone, Tokyo (JP)

(*) Notice: Subject to any disclaimer, the term of this patent is extended or adjusted under 35 U.S.C. 154(b) by 38 days.

(21) Appl. No.: 12/863,141

(22) PCT Filed: Jan. 16, 2009

(86) PCT No.: PCT/JP2009/050517
§ 371 (c)(1),
(2), (4) Date: Jul. 29, 2010

(87) PCT Pub. No.: WO2009/091019
PCT Pub. Date: Jul. 23, 2009

(65) Prior Publication Data
US 2011/0050213 A1    Mar. 3, 2011

(30) Foreign Application Priority Data
Jan. 16, 2008 (JP) ................................. 2008-006385

(51) Int. Cl.
*B65G 43/00* (2006.01)
(52) U.S. Cl. ............... 324/207.11; 198/444; 198/455; 198/460.1; 198/810.02; 324/228
(58) Field of Classification Search .......... 324/228, 324/207.11; 198/444, 455, 810.02, 460.1
See application file for complete search history.

(56) References Cited

U.S. PATENT DOCUMENTS
4,020,945 A    5/1977 Takeno et al.
5,375,390 A *  12/1994 Frigo et al. ..................... 53/66
7,748,521 B2 * 7/2010 Aizawa et al. ............ 198/810.03
2006/0289280 A1 * 12/2006 Furuya et al. ................. 198/806
2009/0145730 A1  6/2009 Aizawa et al.

FOREIGN PATENT DOCUMENTS
EP            1 873 088 A1    1/2008
(Continued)

OTHER PUBLICATIONS
International Search Report PCT/JP2009/050517, Feb. 24, 2009, 4 pages.
(Continued)

*Primary Examiner* — Reena Aurora
*Assistant Examiner* — Alesa Allgood
(74) *Attorney, Agent, or Firm* — Sughrue Mion, PLLC (57) ABSTRACT

A belt monitoring system which can accurately monitor the condition of a conveyor belt by correcting it for the effect of belt deviation. Wear detecting magnets (11), which are rubber magnets spanning the entire belt width, are embedded at intervals along the circumferential direction of the conveyor belt (2). Also, position determining magnets (12, 12z) are embedded in positions a predetermined distance apart from the wear detecting magnets (11). In addition, a plurality of magnetic field detecting means (13: 13A-13G) for detecting the magnetic fields from the magnets (11, 12, 12z), which are arranged at predetermined intervals in the width direction of the conveyor belt (2), are disposed in a position spaced apart from the surface of the conveyor belt (2). The state of deviation of the conveyor belt (2) is detected based on the output signals from the position determining magnets (12, 12z) detected by the magnetic field detection means (13), and then the belt thickness distribution of the conveyor belt (2) in the width direction is corrected based on the detected state of belt deviation.

7 Claims, 8 Drawing Sheets

FOREIGN PATENT DOCUMENTS

| | | | |
|---|---|---|---|
| JP | 51-043578 | A | 4/1976 |
| JP | 06-048533 | A | 2/1994 |
| JP | 08-244952 | A | 9/1996 |
| JP | 2005-306603 | * | 11/2006 |
| JP | 2006-315858 | A | 11/2006 |
| JP | 2006315858 | | 11/2006 |
| JP | 2007-284150 | A | 11/2007 |

OTHER PUBLICATIONS

Australian Patent Examination Report issued in Application No. 2009205075 dated Sep. 21, 2012.

* cited by examiner

BELT MONITORING SYSTEM

CROSS REFERENCE TO RELATED APPLICATIONS

This application is a National Stage of International Application No. PCT/JP2009/050517 filed Jan. 16, 2009, claiming priority based on Japanese Patent Application No. 2008-006385, filed Jan. 16, 2008, the contents of all of which are incorporated herein by reference in their entirety.

TECHNICAL FIELD

The present invention relates to a belt monitoring system capable of accurately monitoring the condition, such as belt thickness distribution, of a conveyor belt.

BACKGROUND ART

Figure 8A:
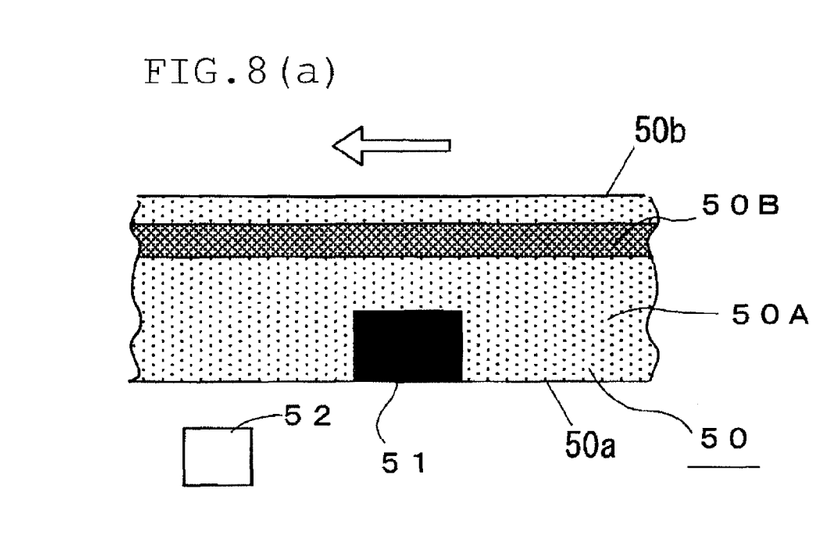
FIG. 8 is illustrations showing a conventional method for detecting wear of a conveyor belt.
Figure 8B:
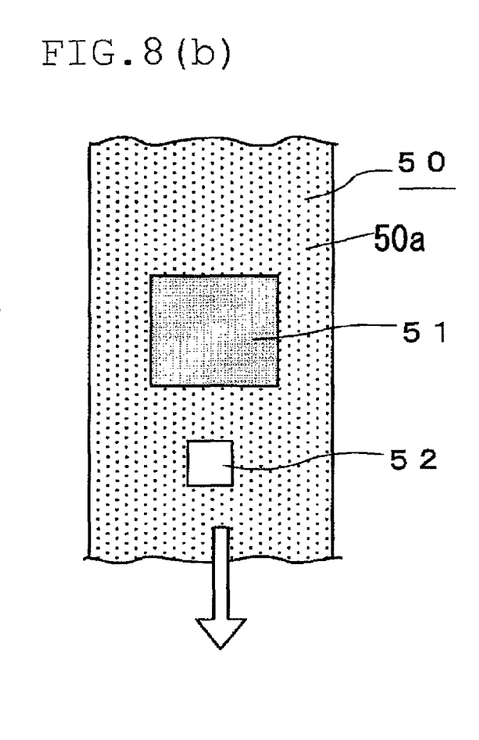
Figure 8C:
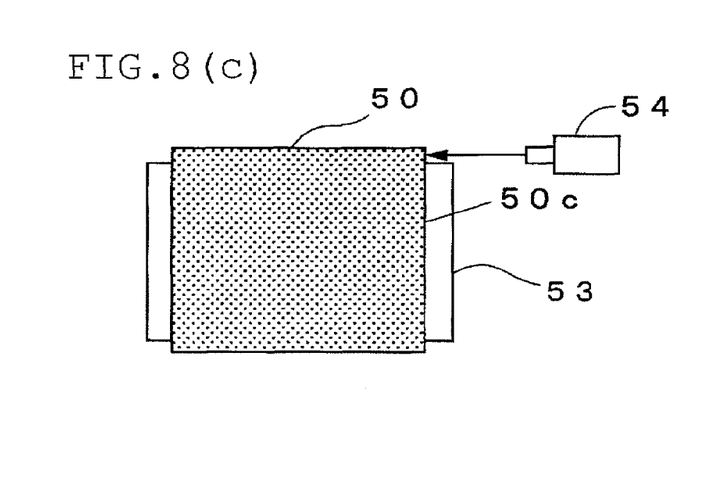

Conventional methods for detecting the wear status of a conveyor belt or a feed belt have been such that, as shown in FIGS. 8A and 8B, a rubber magnet 51, which is magnetized in the thickness direction of a conveyor belt 50, is embedded between the surface 50a of a rubber member 50A of a conveyor belt 50 and a reinforcement member 50B provided on the rear surface 50b side of the conveyor belt 50, and also a magnetic sensor 52, which detects changes in the magnetic field from the rubber magnet 51, is disposed in a location where the rubber magnet 51 passes by. And the depth of wear of the conveyor belt 50 is calculated from the magnitude of magnetic field detected by this arrangement. Also, as shown in FIG. 8C, a belt deviation detecting means 54 is disposed in a position lateral to a pulley 53 around which the conveyor belt 50 is wrapped, and thus the amount of deviation of the conveyor belt 50 is measured using a noncontact distance sensor such as an ultrasonic sensor. Then the depth of wear of the conveyor belt 50, or the thickness of the worn belt, is calculated with accuracy by correcting the calculated depth of wear of the conveyor belt 50 for the amount of belt deviation measured as described above. See Reference 1, for example.

Figure 9A:
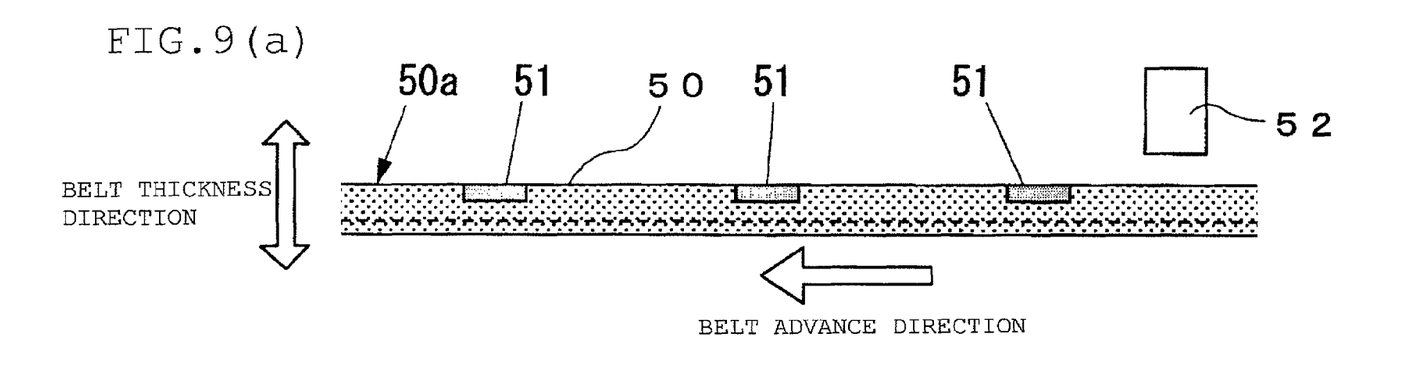
FIG. 9 is illustrations showing a conventional method for measuring a belt thickness distribution of a conveyor belt in the width direction.
Figure 9B:
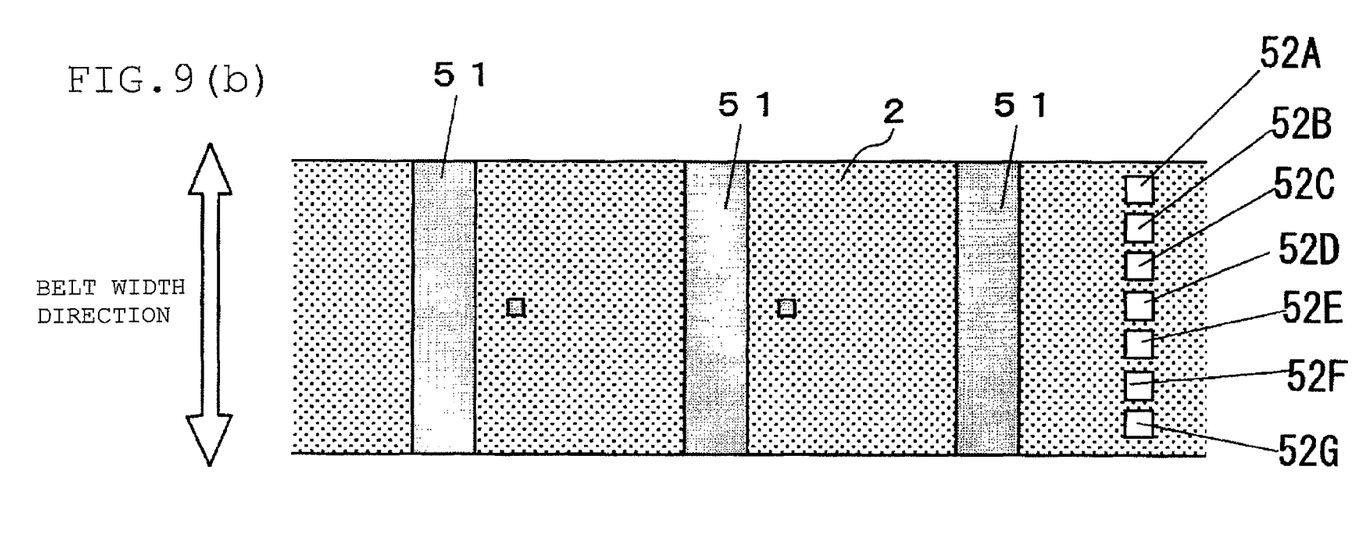

Also, the conveyor belt 50 is most susceptible to wear in the middle portion of the belt width where the loads are placed. Therefore, as the wear progresses, the thickness of the belt will have a distribution (unevenness) in the belt width direction. Thus, in order to measure the distribution of belt thickness in the width direction of the conveyor belt 50, the rubber magnets 51 are disposed over the entire width of the conveyor belt 50, and at the same time a plurality of the magnetic sensors 52 are arranged at predetermined intervals in the belt width direction as shown in FIGS. 9A and 9B.

Reference 1: Japanese Unexamined Patent Application Publication No. 2007-284150

DISCLOSURE OF THE INVENTION

Problems to be Solved by the Invention

However, the above-described method requires provision of a separate belt deviation detecting means 54 in order to detect the lateral deviation or sway of a conveyor belt 50.

The belt deviation detecting means 54 measures the distance to a side of the conveyor belt 50 wrapped around a pulley 53. Hence, there may be cases where the amount of belt deviation measured by the belt deviation detecting means 54 differs from the actual amount of belt deviation near the above-mentioned magnetic sensors 52.

Thus, it has been difficult to detect the distribution of belt thickness in the belt width direction of the conveyor belt 50 accurately by making corrections for the amount of belt deviation as described above.

The present invention has been made in view of these conventional problems, and an object thereof is to provide a belt monitoring system capable of accurately monitoring the condition of a conveyor belt by making corrections for the effect of belt deviation.

Means for Solving the Problem and Effect of the Invention

In a first aspect, the invention provides a belt monitoring system for detecting the condition of a conveyor belt, which comprises a transmitting sensor disposed on a conveyor belt for transmitting signals and a receiving sensor for receiving the signals from the transmitting sensor. The transmitting sensor includes a first transmitting sensor, which is embedded in a predetermined region in the belt width direction, and a second transmitting sensor, which is embedded in a predetermined position in the width direction of the conveyor belt. And the receiving sensor is a plurality of receiving sensors disposed at predetermined intervals in the belt width direction.

In a second aspect, the invention provides a belt monitoring system in which the first transmitting sensor and the second transmitting sensor are embedded a predetermined distance apart from each other in the circumferential direction of the conveyor belt.

In a third aspect, the invention provides a belt monitoring system in which the second transmitting sensor is embedded deeper than the first transmitting sensor.

In a fourth aspect, the invention provides a belt monitoring system in which the first transmitting sensor is a rubber magnet.

Effect of the Invention

According to the present invention, a first transmitting sensor is embedded in a predetermined region in the width direction of a conveyor belt, and a second transmitting sensor is embedded in a predetermined position in the belt width direction. And a plurality of receiving sensors, which are arranged at predetermined intervals in the width direction of the conveyor belt, are disposed in a position apart from the surface of the conveyor belt. This arrangement makes it possible not only to detect the condition of the conveyor belt in the belt width direction using the signals from the first transmitting sensor but also to correct the detected condition of the conveyor belt for the effect of belt deviation by detecting the lateral deviation of the conveyor belt using the signals from the second transmitting sensor. Therefore, the condition of the conveyor belt can be monitored with high accuracy.

Also, the first transmitting sensor and the second transmitting sensor may be embedded a predetermined distance apart from each other in the circumferential direction of the conveyor belt. This will separate the signals from the first transmitting sensor and the signals from the second transmitting sensor clearly from each other, so that the accuracy of monitoring can be further improved.

Also, by embedding the second transmitting sensor deeper than the first transmitting sensor, the deviation of the conveyor belt may be detected reliably even when the wear of the conveyor belt has progressed.

Further, if a rubber magnet is employed as the first transmitting sensor, then the flexibility of the conveyor belt will be improved, which in turn will improve the durability of the conveyor belt. Moreover, the rubber magnet, which excels in its adhesion to the rubber of the conveyor belt, helps prevent the falling off of the sensor.

REFERENCE NUMERALS 1 pulley
2 conveyor belt
2a surface
2b rear surface
2A rubber member
2B reinforcement member
10 belt monitoring system
11 wear detecting magnet
12, 12z position determining magnet
13, 13A to 13G magnetic field detecting means
14 belt center position determining means
15 belt thickness distribution calculating means
16 belt thickness distribution correcting means
17 computing unit
20 belt conveyor control unit

BEST MODE FOR CARRYING OUT THE INVENTION

The best mode (preferred embodiments) of the present invention will be described hereinbelow with reference to the accompanying drawings.

The following description of the preferred embodiments relates to a case of monitoring the distribution of belt thickness in the belt width direction which results from the wear of the conveyor belt.

FIGS. 1 to 5 illustrate the best mode for carrying out invention.

Figure 1:
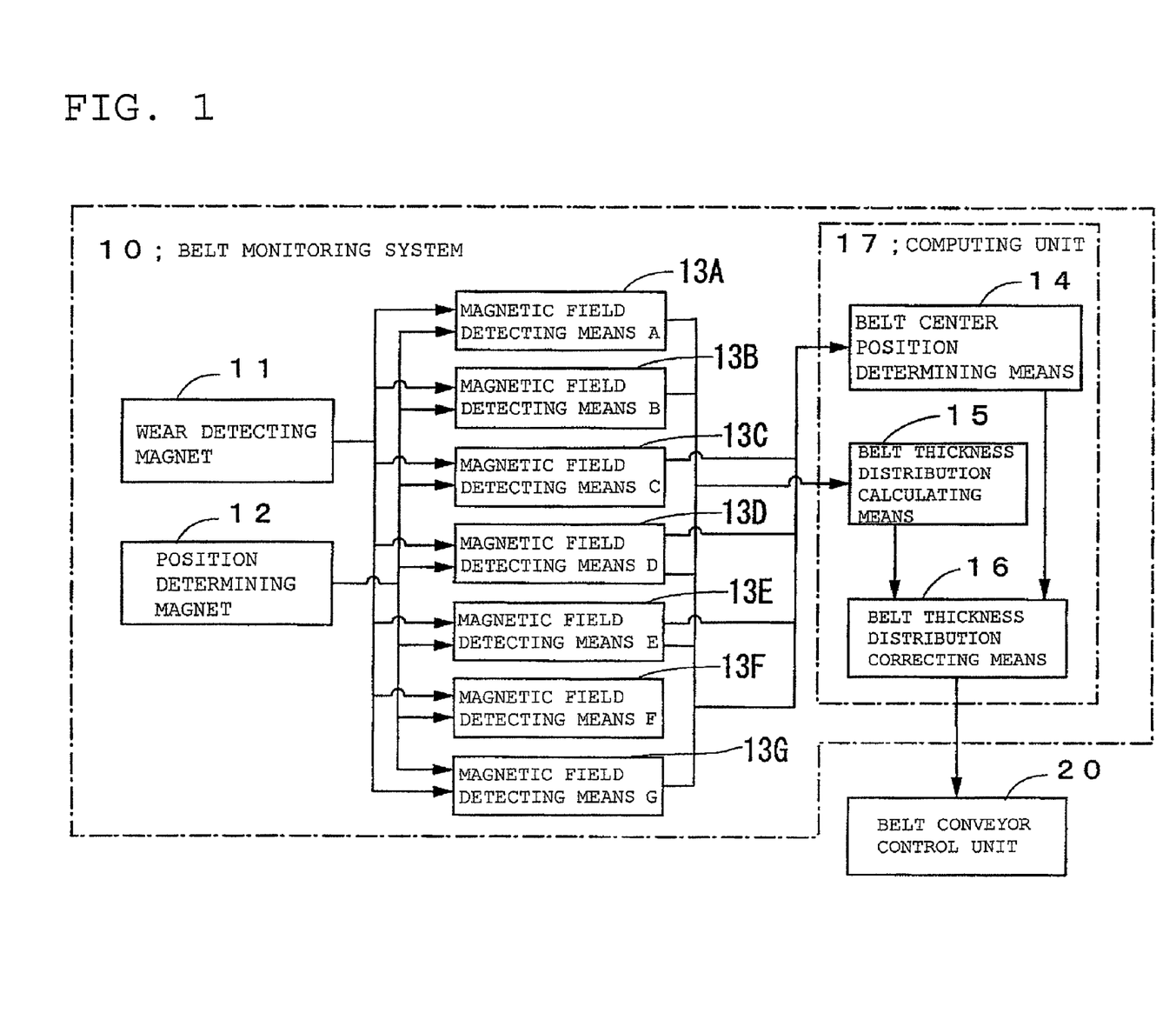
FIG. 1 is a functional block diagram showing a configuration of a monitoring system according to a preferred embodiment of the present invention.

FIG. 1 is a functional block diagram of a monitoring system 10 according to the present invention.

Figure 2:
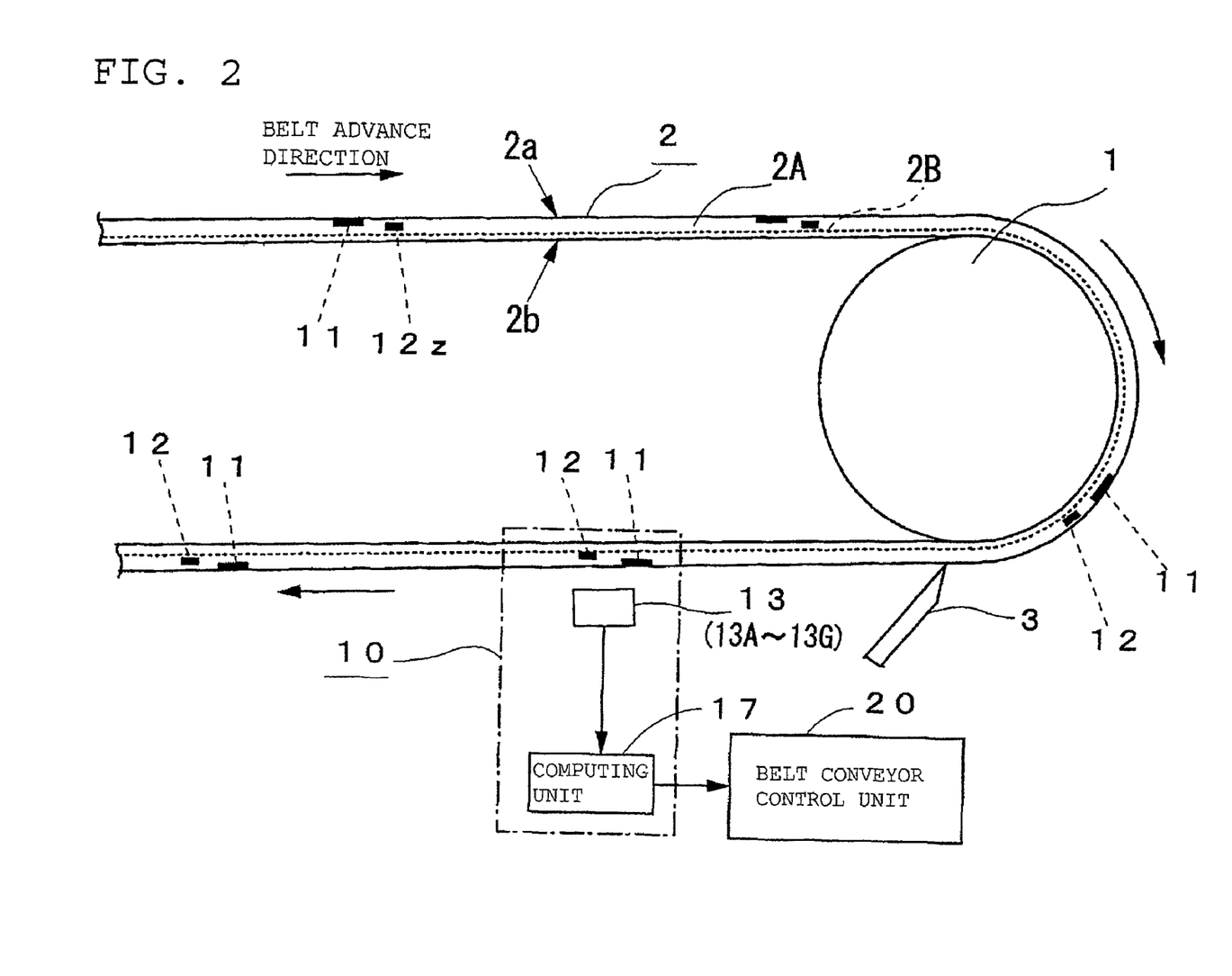
FIG. 2 is a side view of the unloading end of a belt conveyor system.

FIG. 2 is a side view of the unloading end of a belt conveyor system.

Figure 3:
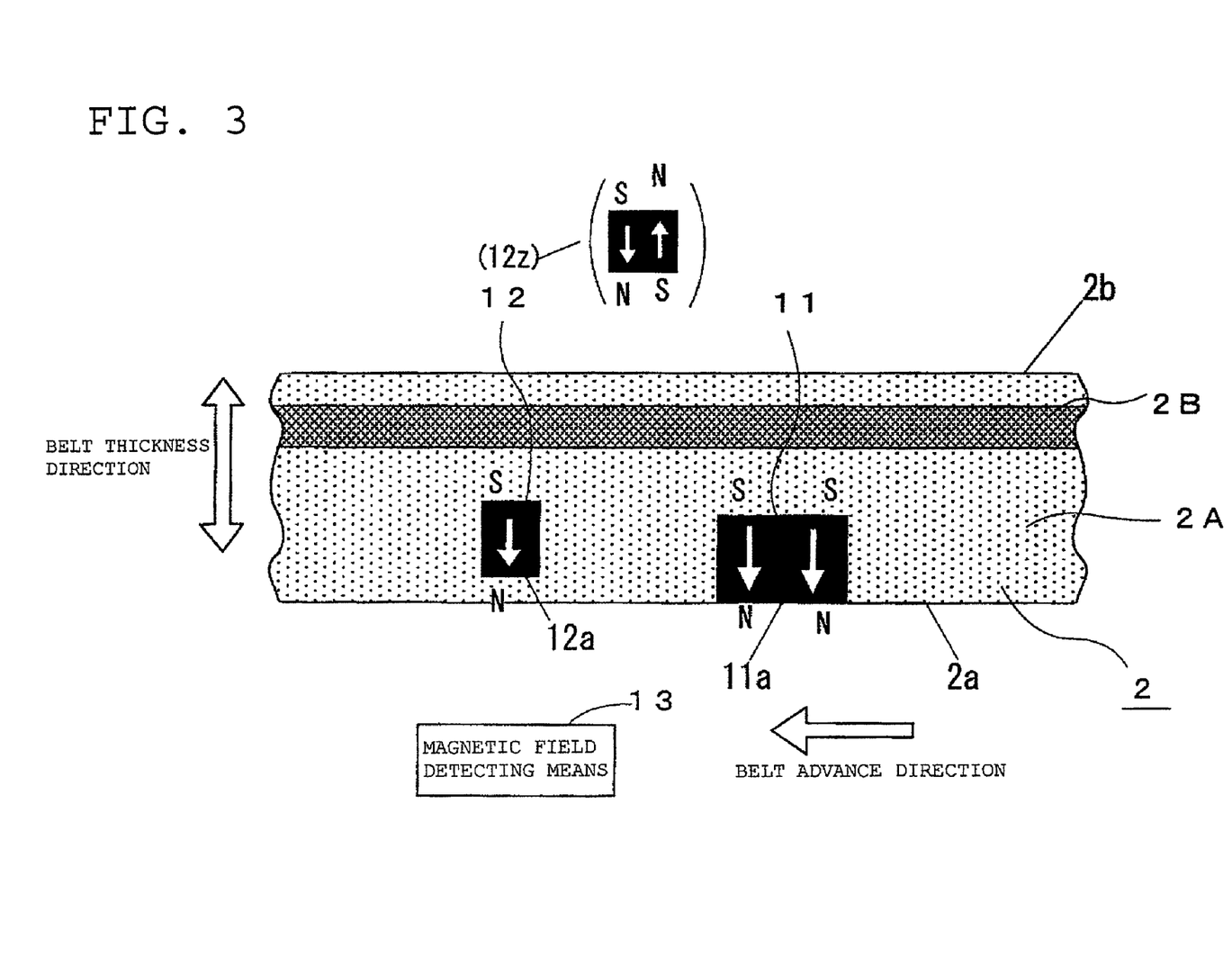
FIG. 3 is a sectional view showing where the rubber magnets are embedded in a conveyor belt.

FIG. 3 is a sectional view showing where the rubber magnets are embedded in a conveyor belt 2.

Figure 4:
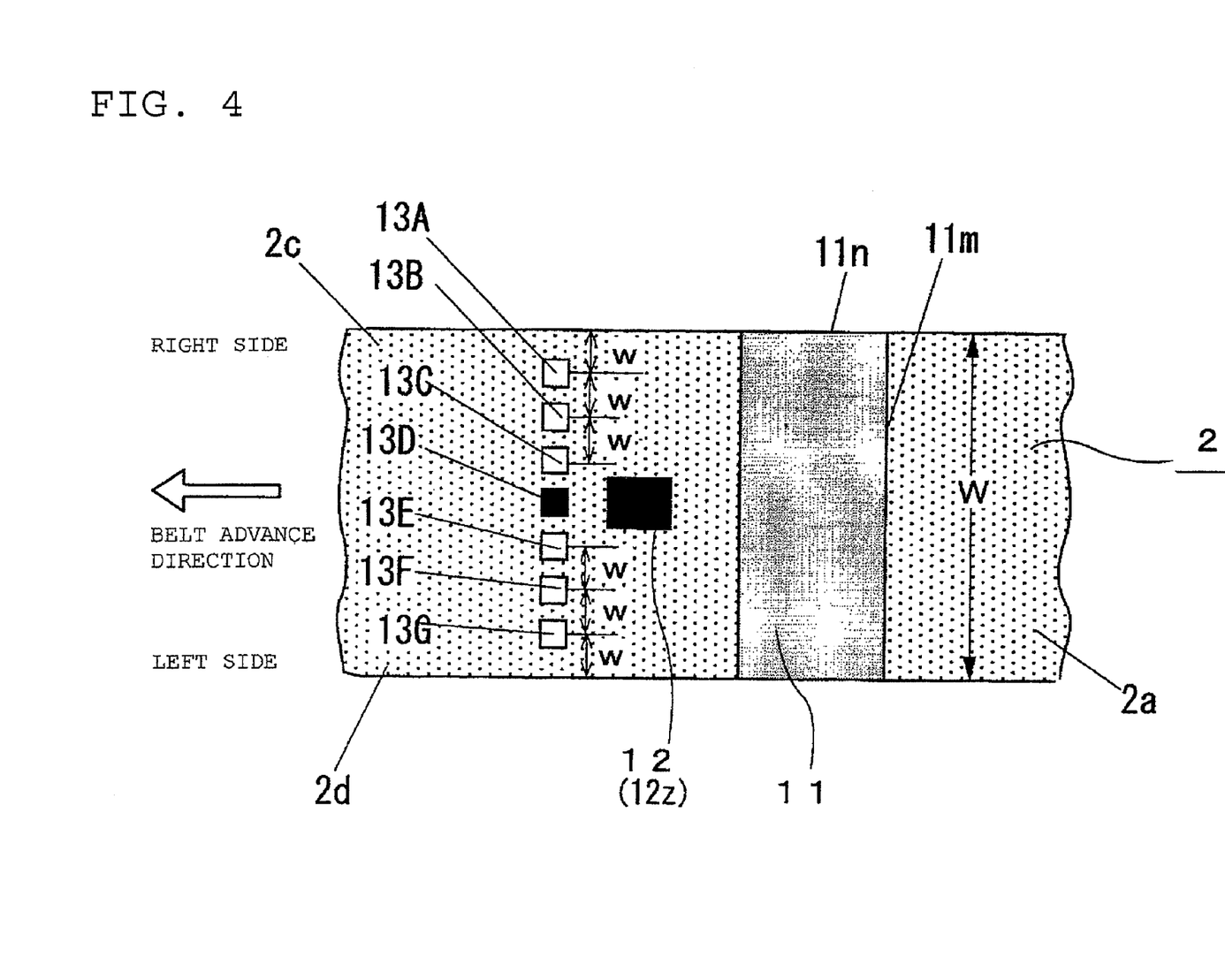
FIG. 4 is a plan view of a conveyor belt seen from the measuring unit side.
Figures 5A, 5B:
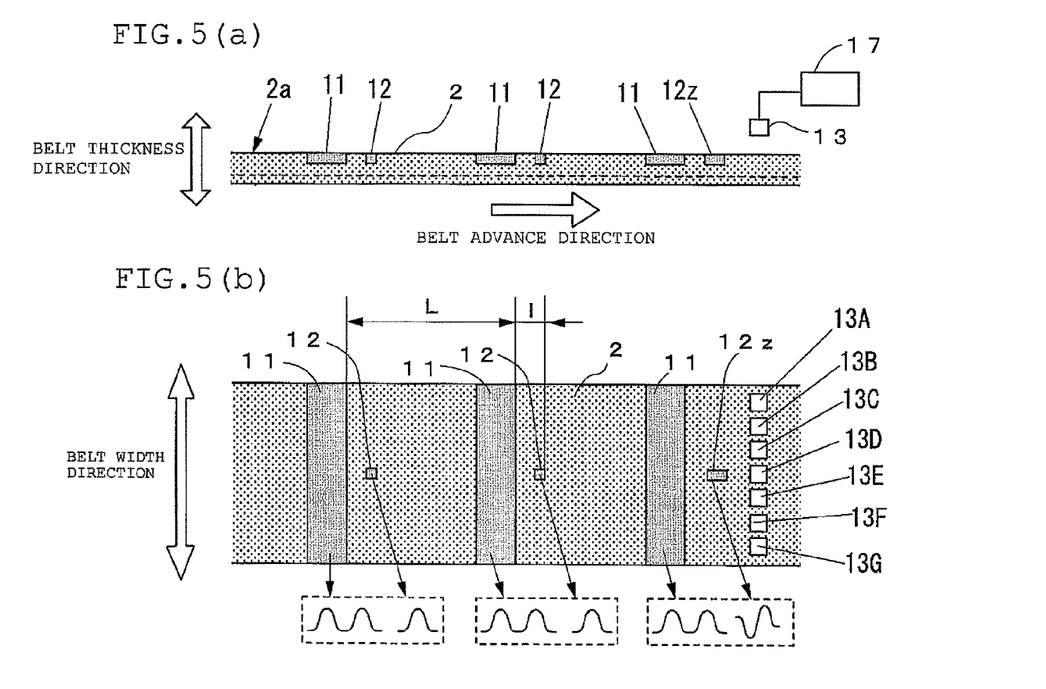
FIG. 5 is an illustration of a return-side straight-run portion of a conveyor belt.

FIG. 4 is a feature plan view of a conveyor belt 2 seen from the measuring unit side.

FIG. 5 is an illustration of a return-side straight-run portion of a conveyor belt 2, showing a case where a position determining and cycle reference position determining magnet 12z is located in a return-side straight-run portion.

The monitoring system 10 includes a wear detecting magnet 11 as a first transmission means, position determining magnets 12 (12, 12z) as a second transmission means, a magnetic field detecting means 13 (13A to 13G) as a reception means, a belt center position determining means 14, a belt thickness distribution calculating means 15, and a belt thickness distribution correcting means 16.

The belt center position determining means 14, the belt thickness distribution calculating means 15, and the belt thickness distribution correcting means 16 constitute a computing unit 17 of the monitoring system 10.

Reference numeral 12z denotes the position determining and cycle reference position determining magnet which is used to determine the position of a wear detecting magnet 11 and also to determine the reference position in the length direction of the conveyor belt 2.

On the other hand, reference numeral 12 denotes the position determining magnet which is used to determine the position of the wear detecting magnet 11. Hereinbelow, the position determining and cycle reference position determining magnet 12z will be referred to as a reference magnet, whereas the other position determining magnets 12 will be referred to simply as position determining magnets.

The reference magnet 12z is embedded in one place of the conveyor belt 2, and as will be discussed later, it is magnetized in a magnetic pattern different from that of the position determining magnets 12.

The wear detecting magnet 11 is a sheet-like rubber magnet having a long side 11m which is substantially equal to the width of the conveyor belt 2 wrapped around the pulley 1 and a short side 11n which is shorter than the long side 11m. The wear detecting magnet 11 is embedded between the surface 2a of a rubber member 2A of the conveyor belt 2 and a reinforcement member 2B, which is organic fibers such as aramid fibers coated with a cover rubber, inserted on the rear surface 2b side of the conveyor belt 2. The thickness direction thereof is identical with the thickness direction of the conveyor belt 2. Also, the wear detecting magnet 11 is embedded such that the long side 11m extends in a direction perpendicular to the advance direction of the conveyor belt 2. That is, the wear detecting magnet 11 is embedded over the entire width of the conveyor belt 2. The surface of the wear detecting magnet 11 is exposed on the surface 2a of the rubber member 2A of the conveyor belt 2. The wear detecting magnet 11 is magnetized in the sheet thickness direction, which is the direction parallel to the thickness direction of the conveyor belt 2. Thus the magnetization pattern is such that two north poles are arranged side by side in the belt advance direction on the surface side of the conveyor belt 2.

The position determining magnet 12 and the reference magnet 12z are both a sheet-like rubber magnet having a substantially rectangular surface of a flat plate. The position determining magnet 12 is magnetized in the sheet thickness direction, which is the direction parallel to the thickness direction of the conveyor belt 2, and the magnetization pattern is such that the north pole is on the surface side of the conveyor belt 2. On the other hand, the reference magnet 12z is magnetized in such a magnetization pattern that a rubber magnet magnetized in the thickness direction having the north pole on the surface side of the conveyor belt 2 and a rubber magnet magnetized in the thickness direction having the south pole on the surface side of the conveyor belt 2 are arranged side by side in the advance direction of the conveyor belt 2. The position determining magnet 12 and the reference magnet 12z are embedded between the surface 2a of the rubber member 2A and the reinforcement member 2B, but, different from the wear detecting magnet 11, they are embedded in such position that the surface 12a thereof is positioned a predetermined depth deeper than the surface 2a of the rubber member 2A.

Also, the wear detecting magnet 11 and the position determining magnet 12, as well as the wear detecting magnet 11 and the reference magnet 12z, are embedded with a predetermined distance l between them in the circumferential direction of the conveyor belt 2. In the present embodiment, the position determining magnet 12 and the reference magnet 12z are embedded on the front side of the wear detecting magnet 11 in the advance direction of the conveyor belt 2. The above-mentioned predetermined distance l is preferably a shortest possible distance while it is preferably such that the interference between the magnetic field from the wear detecting magnet 11 and the magnetic field from the position determining magnet 12 or the reference magnet 12z can be ignored.

Provided in the conveyor belt 2 of the present embodiment are a single pair of the wear detecting magnet 11 and the reference magnet 12z and a plurality of pairs of the wear detecting magnet 11 and the position determining magnet 12 arranged with the predetermined distance l therebetween. Also, these pairs are spaced apart from each other by a predetermined interval L.

The magnetic field detecting means 13 (13A to 13G) detect the magnitude of magnetic field generated by the wear detecting magnet 11 and the magnitude of magnetic field generated by the position determining magnet 12 or the reference magnet 12z. And known magnetism detecting means such as magnet meters using a gaussmeter, loop coil, and magnetic impedance element (MI element) can be employed as the magnetic field detecting means 13. In the present embodiment, there are seven magnetic field detecting means 13, and these magnetic field detecting means 13A to 13G are disposed at predetermined intervals in the width direction of the conveyor belt 2.

In order to raise the detection sensitivity of the magnetic field detecting means 13, it is preferable that they are placed in a position as close to the surface 2a of the conveyor belt 2 as practicable.

As for the location in the belt circumferential direction, the magnetic field detecting means 13 should preferably be placed behind a scraper 3 on the return side of the conveyor belt 2 as shown in FIG. 2. In this manner, the detection can be made in a place where the conveyor belt 2 is clean after the objects carried by the conveyor belt 2 are scraped off by the scraper 3.

Also, the location of the magnetic field detecting means 13 in the belt width direction is as shown in FIG. 4. That is, if the front side is in the advance direction of the conveyor belt 2 as in the figure, the magnetic field detecting means 13A, which is located on the right-hand edge 2c side of the conveyor belt 2, is disposed directly below a position dislocated toward the middle of the belt in the belt width direction from the edge 2c by $w=W/(n+1)$ where W is the width of the conveyor belt 2 and n is the number of the magnetic field detecting means 13. And the magnetic field detecting means 13B to 13G are respectively disposed in positions dislocated by w each in the belt width direction from the magnetic field detecting means 13A. As a result, the magnetic field detecting means 13G is disposed directly below a position dislocated by w in the belt width direction toward the middle of the belt from the left-hand edge 2d of the conveyor belt 2, and the magnetic field detecting means 13D is disposed at the belt width center of the conveyor belt 2.

The belt center position determining means 14 compares the magnitudes of magnetic fields generated by the position determining magnet 12 or the reference magnet 12z as detected respectively by the magnetic field detecting means 13D located in the center and the magnetic field detecting means 13C and 13E located on the right and left thereof, which are among the magnetic field detecting means 13A to 13G. And it determines which of the magnetic field detecting means 13C and 13E is directly below the belt width center of the conveyor belt 2 by determining the magnetic field detecting means detecting the greatest magnitude of magnetic field.

When the conveyor belt 2 is not deviating, the magnetic field detecting means 13D will have a highest output because the magnetic field detecting means 13D disposed directly below the belt width center of the conveyor belt 2 is close to the belt width center of the conveyor belt 2. When the conveyor belt 2 is deviating with the width center thereof being dislocated by (w/2)mm or more to the right, the magnetic field detecting means 13E, which is located on the immediate left of the magnetic field detecting means 13D, will have a highest output. Conversely, when the conveyor belt 2 is deviating with the width center thereof being dislocated by (w/2)mm or more to the left, the magnetic field detecting means 13C, which is located on the immediate right of the magnetic field detecting means 13D, will have a highest output.

The belt thickness distribution calculating means 15 calculates the distribution of belt thickness in the width direction of the conveyor belt 2 on the assumption that the conveyor belt 2 is not deviating, using the outputs of the magnetic field detecting means 13A to 13G, the previously stored position data in the belt width direction concerning the magnetic field detecting means 13A to 13G, and the previously determined relationship between the outputs of the magnetic field detecting means 13 and belt thickness.

The belt thickness distribution correcting means 16 corrects the distribution of belt thickness in the belt width direction calculated by the belt thickness distribution calculating means 15, based on the "number" of the magnetic field detecting means 13 which is directly below the width center of the conveyor belt 2 as determined by the belt center position determining means 14. The result of this correction is sent to the belt conveyor control unit 20 which controls the drive and braking of the conveyor belt 2.

Next, a description will be given of a method for detecting the distribution of wear in the width direction of the conveyor belt 2 using a monitoring system 10 of the present invention.

As the conveyor belt 2 moves in the direction of the arrows in FIG. 2, the magnetic field from the position determining magnet 12 or the reference magnet 12z is first detected by each of the magnetic field detecting means 13A to 13G. The detected magnetic field from the position determining magnet 12 has one positive peak, whereas the detected magnetic field from the reference magnet 12z has one negative peak and one positive peak (see FIG. 5B). The belt center position determining means 14 compares the magnitudes of the detected outputs of the magnetic field detecting means 13C, 13D, and 13E. As a result of the comparison, when the magnetic field detecting means 13D has a highest output, the belt center position determining means 14 determines that the conveyor belt 2 is not deviating, that is, the magnetic field detecting means 13 directly below the width center of the conveyor belt 2 is the magnetic field detecting means 13D, and sends the result to the belt thickness distribution correcting means 16.

As the belt conveyor 2 moves further on, the magnetic field from the position determining magnet 12 or the reference magnet 12z affecting the magnetic field detecting means 13A to 13G decreases, and in its place the magnetic field from the wear detecting magnet 11 is detected. The detected magnetic field from the wear detecting magnet 11 has two positive peaks (see FIG. 5B).

Figure 6:
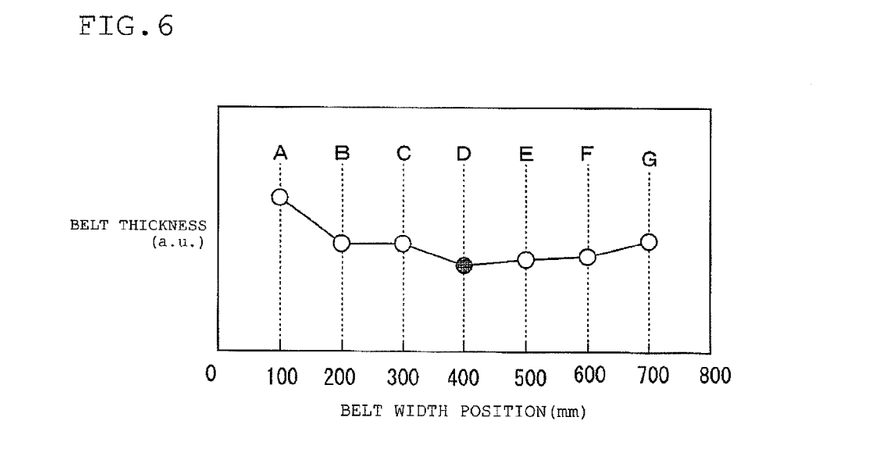
FIG. 6 is a diagram showing an example of belt thickness distribution in the width direction of a conveyor belt when the conveyor belt is not deviating.

The belt thickness distribution calculating means 15 takes in the detection outputs of the magnetic field detecting means 13A to 13G and converts the detection outputs into belt thicknesses using a previously determined relationship between the outputs of the magnetic field detecting means 13 and the belt thicknesses. At the same time, the belt thickness distribution calculating means 15 calculates the distribution of belt thickness in the width direction of the conveyor belt 2, using the previously stored position data in the belt width direction concerning the magnetic field detecting means 13A to 13G, and sends it to the belt thickness distribution correcting means 16. FIG. 6 is a graph showing an example of the distribution, in which the horizontal axis represents the positions in the belt width direction of the magnetic field detecting means 13A to 13G as measured from the right-side edge 2c of the conveyor belt 2 as the reference point on the assumption that the belt conveyor 2 is not deviating and the vertical axis represents the belt thickness. It should be noted that the belt thickness can vary with the type of belt and therefore the unit employed is a.u. Also, note that n=7, W=800 mm, and w=100 mm in this example.

The belt thickness distribution correcting means 16 corrects the distribution of belt thickness in the belt width direction calculated by the belt thickness distribution calculating means 15, based on the "number" of the magnetic field detecting means 13 which is directly below the width center of the conveyor belt 2 as determined by the belt center position determining means 14. Since the belt center position determining means 14 determines that the magnetic field detecting means 13D which is directly below the belt width center when the conveyor belt is not deviating is actually at the center of the belt width, there is no need for correction of the distribution of belt thickness in the belt width direction calculated by the belt thickness distribution calculating means 15. Therefore, the belt thickness distribution correcting means 16 sends the data on the distribution of belt thickness in the width direction of the conveyor belt 2 as calculated by the belt thickness distribution calculating means 15, as shown in FIG. 6, directly to the belt conveyor control unit 20.

Figure 7A:
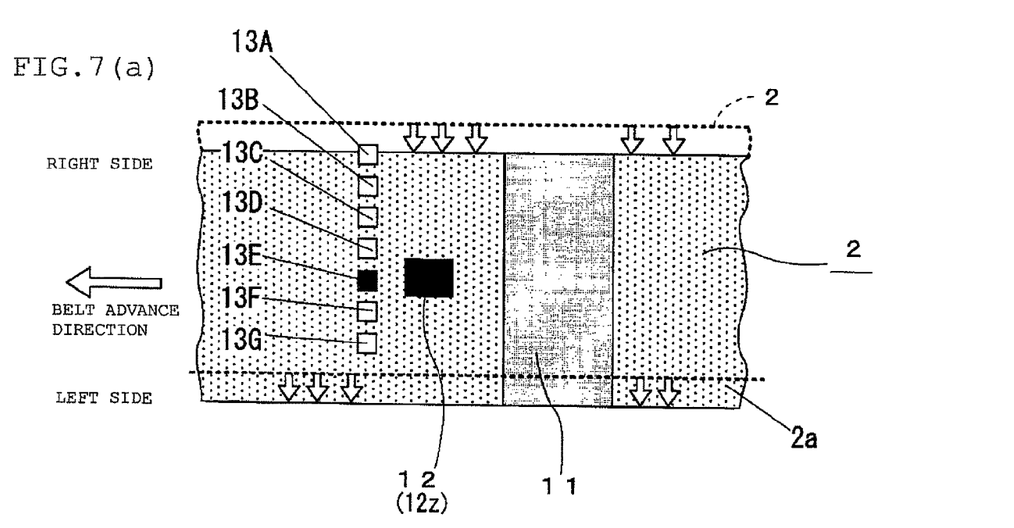
FIG. 7 is diagrams for explaining how to correct a belt thickness distribution of a conveyor belt in the width direction when the conveyor belt is deviating.

Now, when the conveyor belt 2 is deviating significantly to the right as shown in FIG. 7A, the detection output of the magnetic field detecting means 13E becomes the highest. The belt center position determining means 14 determines that the magnetic field detecting means 13 directly below the belt width center of the conveyor belt 2 is the magnetic field detecting means 13E, and sends the result to the belt thickness distribution correcting means 16.

On the other hand, the belt thickness distribution calculating means 15 takes in the detection outputs of the magnetic field detecting means 13A to 13G, calculates the distribution of belt thickness in the width direction of the conveyor belt 2, and sends it to the belt thickness distribution correcting means 16. At this time, the distribution of belt thickness in the belt width direction which is sent to the belt thickness distribution correcting means 16 is such that, as represented by the horizontal axis of FIG. 7B, the positions of the magnetic field detecting means 13A to 13G are the same as the initial positions when the conveyor belt 2 is not deviating. In other words, when the conveyor belt 2 is deflected significantly to the right, the output of the magnetic field detecting means 13A is extremely small such that the value of the belt thickness cannot be calculated and is thus left blank.

Figure 7B:
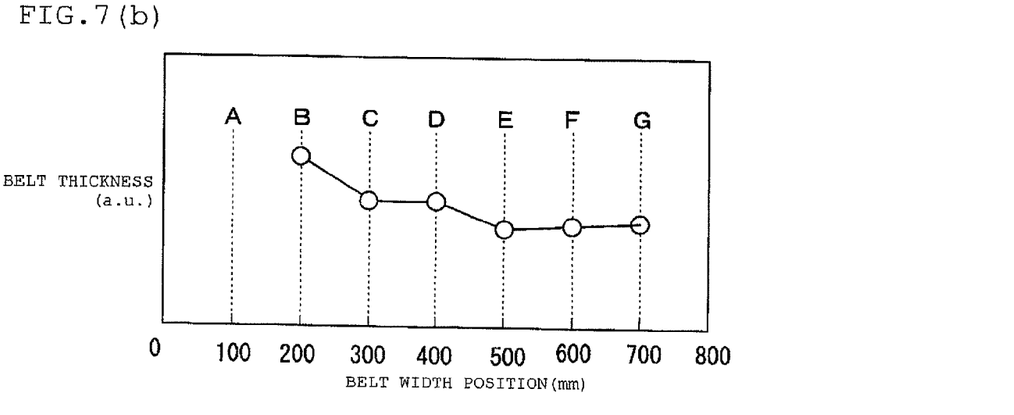
Figure 7C:
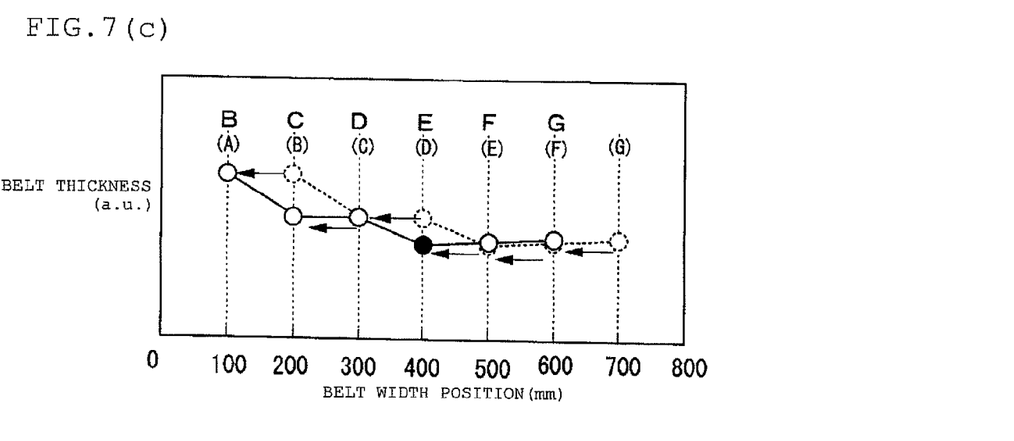

The belt thickness distribution correcting means 16 corrects the distribution of belt thickness in the belt width direction calculated by the belt thickness distribution calculating means 15 as shown in FIG. 7B, based on the information that the magnetic field detecting means 13 which is directly below the width center of the conveyor belt 2 as determined by the belt center position determining means 14 is the magnetic field detecting means 13E. More specifically, as shown in FIG. 7C, the data on the belt thicknesses as measured by the magnetic field detecting means 13B to 13G indicated by dotted lines in the figure are shifted to the left so that the position of the magnetic field detecting means 13E directly below the width center of the conveyor belt 2 may come to the belt width center position (400 mm). That is, the data on the belt thicknesses as measured by the magnetic field detecting means 13B to 13G are now considered as the data on the belt thicknesses measured by the magnetic field detecting means 13A to 13F, and thus these data are used as the corrected distribution of belt thickness. The belt thickness distribution thus obtained is the belt thickness distribution indicated by solid lines in the figure, and the data are the data on the actual belt thickness distribution that has been obtained in consideration of the deviation of the conveyor belt 2.

Also, when the conveyor belt 2 is deviating significantly to the left, the detection output of the magnetic field detecting means 13C becomes the highest. In this case, too, the data on the belt thicknesses as measured by the magnetic field detecting means 13A to 13F are considered as the data on the belt thicknesses measured by the magnetic field detecting means 13B to 13G (the data on the belt thicknesses are shifted to the right) in a similar manner to when the conveyor belt 2 is deviating significantly to the right, and these data are used as the corrected distribution of belt thickness. Thus, data on the actual belt thickness distribution can be obtained in consideration of the deviation of the conveyor belt 2.

Here, let N be the number of the wear detecting magnets 11 disposed on the conveyor belt 2, then the belt thickness distribution at N points will be measured once each during a full circle of the conveyor belt 2. In order to determine the depth of wear of the conveyor belt 2 with high accuracy, it is desirable that measurement be made at each measuring point a plural number of times. Also, when the conveyor belt 2 is worn, it is not always the case that the depth of wear is uniform in the circumferential direction of the belt. Therefore, it is necessary to take into consideration the circumferential distribution of the depth of wear (belt thickness).

In the present embodiment, a reference magnet 12z is provided as a position determining magnet, and the position of the reference magnet 12z is used as the reference point in the circumferential direction of the conveyor belt 2. The detected magnetic field from the position determining magnet 12 has one positive peak. On the other hand, the detected magnetic field from the reference magnet 12z has one negative peak and one positive peak (see FIG. 5B). Hence, when any of the detection outputs of the magnetic field detecting means 13C, 13D, and 13E is a detection output having a positive and a negative peak, the belt thickness distribution detected by the magnetic field detecting means 13A to 13D and calculated by the belt thickness distribution calculating means 15 is the belt thickness distribution at the reference point in the circumferential direction of the conveyor belt 2. The distance between the reference magnet 12z and the position determining magnet 12 to be detected next to the reference magnet 12z and the distance between adjacent position determining magnets 12 are both L, which is the same interval as that between the pairs of the wear detecting magnet 11 and the position determining magnet 12. It is possible to identify the measuring position by counting the number of position detections of the position determining magnets 12 after the position detection of the reference magnet 12z. Since the belt thickness at the identified point (the point where the wear detecting magnet 11 is embedded) of the conveyor belt 2 can be measured a plural number of times consecutively and the average value can be obtained, the depth of wear of the conveyor belt 2 can be determined with high accuracy and at the same time the distribution of the depth of wear (belt thickness) in the circumferential direction can also be calculated.

Thus, according to the preferred embodiments of the present invention, wear detecting magnets 11, which are rubber magnets spanning the entire width of the conveyor belt 2, are embedded at intervals of L along the circumferential direction of the conveyor belt 2, and a position determining magnet 12 or a reference magnet 12z is embedded in a position a predetermined distance l apart from each wear detecting magnet 11. On the other hand, a plurality of magnetic field detecting means 13 (13A to 13G), which detect the magnetic fields from the wear detecting magnet 11 and the position determining magnet 12 or 12z, are disposed at predetermined intervals in the belt width direction of the conveyor belt 2, in a position apart from the surface of the conveyor belt 2. The state of lateral deviation of the conveyor belt 2 is detected based on the output signal from the position determining magnet 12 or 12z as detected by the magnetic field detecting means 13, and the belt thickness distribution of the conveyor belt in the belt width direction, which is calculated from the magnetic fields detected by the magnetic field detecting means 13A to 13G, is corrected based on the detected state of belt deviation. Therefore, the data on the belt thickness distribution can be monitored with excellent accuracy.

Also, in the present embodiment, the rubber magnets employed as the wear detecting magnets 11 and the position determining magnets 12 and 12z can improve the flexibility of the conveyor belt 2 and can also improve the durability thereof. Also, the rubber magnets excel in their adhesion to the rubber of the conveyor belt such that the falling off of the wear detecting magnets 11 and the position determining magnets 12 and 12z as sensors can also be prevented.

It should be noted that, in the foregoing preferred embodiments, seven magnetic field detecting means 13 are provided and these magnetic field detecting means 13A to 13G are disposed at predetermined intervals in the width direction of the conveyor belt 2, but the arrangement is not limited thereto. There may be six or less magnetic field detecting means 13 or eight or more. It is to be noted that the wear status of the conveyor belt 2 may be grasped to some extent even when only two magnetic field detecting means 13 are provided, one at the belt width center and the other toward an edge of the belt width. However, in consideration of the case where there is difference in wear between the right and the left side, it is preferable that three or more odd number of magnetic field detecting means 13 are disposed symmetrically with respect to the belt width center.

Also, in the foregoing embodiments, the wear detecting magnet 11 is disposed over the entire width of the conveyor belt 2 with the length of the long side 11m of the wear detecting magnet 11 being substantially equal to the width of the conveyor belt 2. However, the length of the long side 11m of the wear detecting magnet 11 may be shortened as appropriate, and the wear detecting magnet 11 may be disposed only in a region where wear is conspicuous.

Also, in the foregoing embodiments, the surface 11a of the wear detecting magnet 11 is exposed on the surface 2a of the rubber member 2A of the conveyor belt 2. However, since a satisfactory detection of belt wear can be made even when the wear has progressed to a certain degree, the wear detecting magnet 11 may be embedded in such a position that the surface 11a is a predetermined depth deeper than the surface 2a of the rubber member 2A. It should also be noted that the wear detecting magnet 11 is preferably embedded with the position of the surface 11a thereof being shallower than the surface 12a of the position detecting magnet 12.

Also, it is not always necessary that the position determining magnet 12 and the reference magnet 12z be embedded on the front side of the wear detecting magnet 11 in the advance direction of the conveyor belt 2. They may be embedded on the rear side thereof in the advance direction of the conveyor belt 2. Also, as with the wear detecting magnet 11, the position of the surface 12a thereof may be at the surface 2a of the rubber member 2A. However, as in the foregoing embodiments, it is preferable that they are embedded in a position a predetermined depth deeper than the wear detecting magnet 11 because such will result in less change in output.

Also, the reference magnet 12z may be configured by a position determining magnet 12 and a cycle position determining magnet, or the reference magnet 12z may be discarded and alternatively a cycle position determining magnet may be provided.

Further, the position determining magnet 12 may be embedded directly below the wear detecting magnet 11. In this case, the magnetic field detected by the magnetic field detecting means 13 is the magnetic field from the wear detecting magnet 11 superimposed on the magnetic field from the position determining magnet 12. However, the magnetic field from the position determining magnet 12 is constant irrespective of the wear status of the conveyor belt 2. Therefore, the arrangement may, for instance, be such that the magnitude of detected magnetic field when there is no wear is stored in advance and then the depth of wear of the conveyor belt 2 is calculated by comparing the magnitude of detected magnetic field when the wear has progressed with the magnitude of detected magnetic field when there is no wear. In this way, the belt thickness distribution can be calculated.

Also, in the foregoing embodiments, the position of the width center of the conveyor belt 2 is derived by comparing the outputs of the three magnetic field detecting means, namely, the magnetic field detecting means 13C to 13E. However, where excessive belt deviation is expected, a further increase of the magnetic field detecting means used in determining the belt center position will allow the determination of the belt center position with greater accuracy.

Also, in the foregoing embodiments, the position of the width center of the conveyor belt 2 is determined to be directly above the magnetic field detecting means 13 whose output is the highest. However, the belt center position can be determined with even more accurately if the values of the respective outputs of the magnetic field detecting means 13C to 13E are approximated by quadratic function and the position of the width center of the conveyor belt 2 is determined by the position of the peak.

Also, in the foregoing embodiments, the transmitting sensor consists of the wear detecting magnet 11 and the position determining magnets 12 and 12z, which are rubber magnets, whereas the receiving sensor consists of the magnetic field detecting means 13C to 13E. However, the arrangement is not limited thereto, but other transmitting sensors and receiving sensors may be used. More specifically, a magnetic sheet may be used as a transmitting sensor for wear detection, a gaussmeter or an MI sensor as a receiving sensor. And an IC tag may be used as a transmitting sensor for position determination, and an IC tag reader as a receiving sensor. Or a piece of metal, such as a piece of iron, may be used as a transmitting sensor of position determination, and a metal detection sensor as a receiving sensor.

Also, while the wear detecting magnet 11 is preferably a rubber magnet, it is not necessary that the position determining magnets 12 and 12z be rubber magnets; they may instead be sintered magnets.

INDUSTRIAL APPLICABILITY

As described herein, the present invention provides a belt monitoring system capable of monitoring the condition of a conveyor belt with high accuracy by correcting it for the effect of belt deviation.

The invention claimed is:

1. A belt monitoring system for detecting the condition of a conveyor belt, comprising:
   a transmitting sensor disposed on a conveyor belt for transmitting signals; and
   a receiving sensor for receiving the signals from the transmitting sensor;
   wherein the transmitting sensor includes a first transmitting sensor for detecting wear of the conveyor belt and a second transmitting sensor for detecting a position of the conveyor belt,
   the first transmitting sensor having a belt width length that is longer than a belt circumferential length thereof, the first transmitting sensor being embedded in a predetermined region in the belt width direction and
   the second transmitting sensor having a length in the width direction that is shorter than the belt width length of the first transmitting sensor, the second transmitting sensor being embedded in a predetermined position in the belt width direction of the conveyor belt, and
   wherein the receiving sensor is a plurality of receiving sensors disposed at predetermined intervals in the belt width direction.

2. The belt monitoring system according to claim 1, wherein the first transmitting sensor is a rubber magnet.

3. The belt monitoring system according to claim 1, wherein the first transmitting sensor and the second transmitting sensor are embedded a predetermined distance apart from each other in the circumferential direction of the conveyor belt.

4. The belt monitoring system according to claim 3, wherein the second transmitting sensor is embedded deeper than the first transmitting sensor.

5. The belt monitoring system according to claim 3, wherein the first transmitting sensor is a rubber magnet.

6. The belt monitoring system according to claim 1, wherein the second transmitting sensor is embedded deeper than the first transmitting sensor.

7. The belt monitoring system according to claim 6, wherein the first transmitting sensor is a rubber magnet.

* * * * *